Feb. 18, 1958        H. N. CARVER        2,824,180
TURN SIGNAL SWITCH FOR VEHICLES
Filed March 10, 1955        2 Sheets-Sheet 1
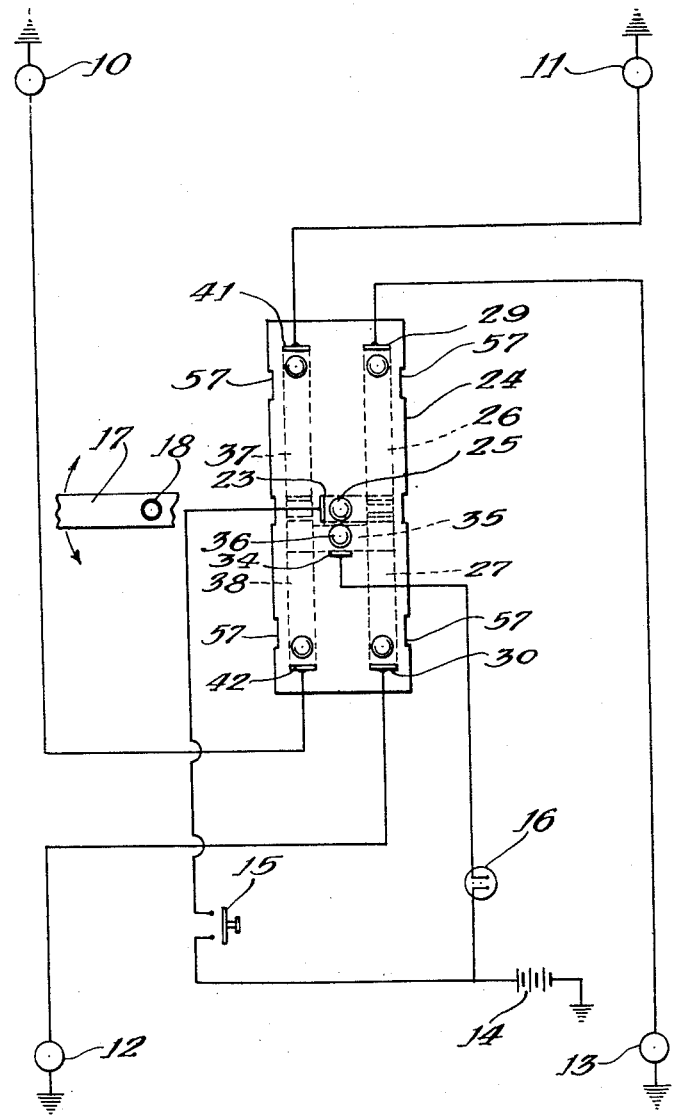
Inventor:
Horace N. Carver
By: Schroeder, Hofgren,
Brady & Wegner
Attorneys

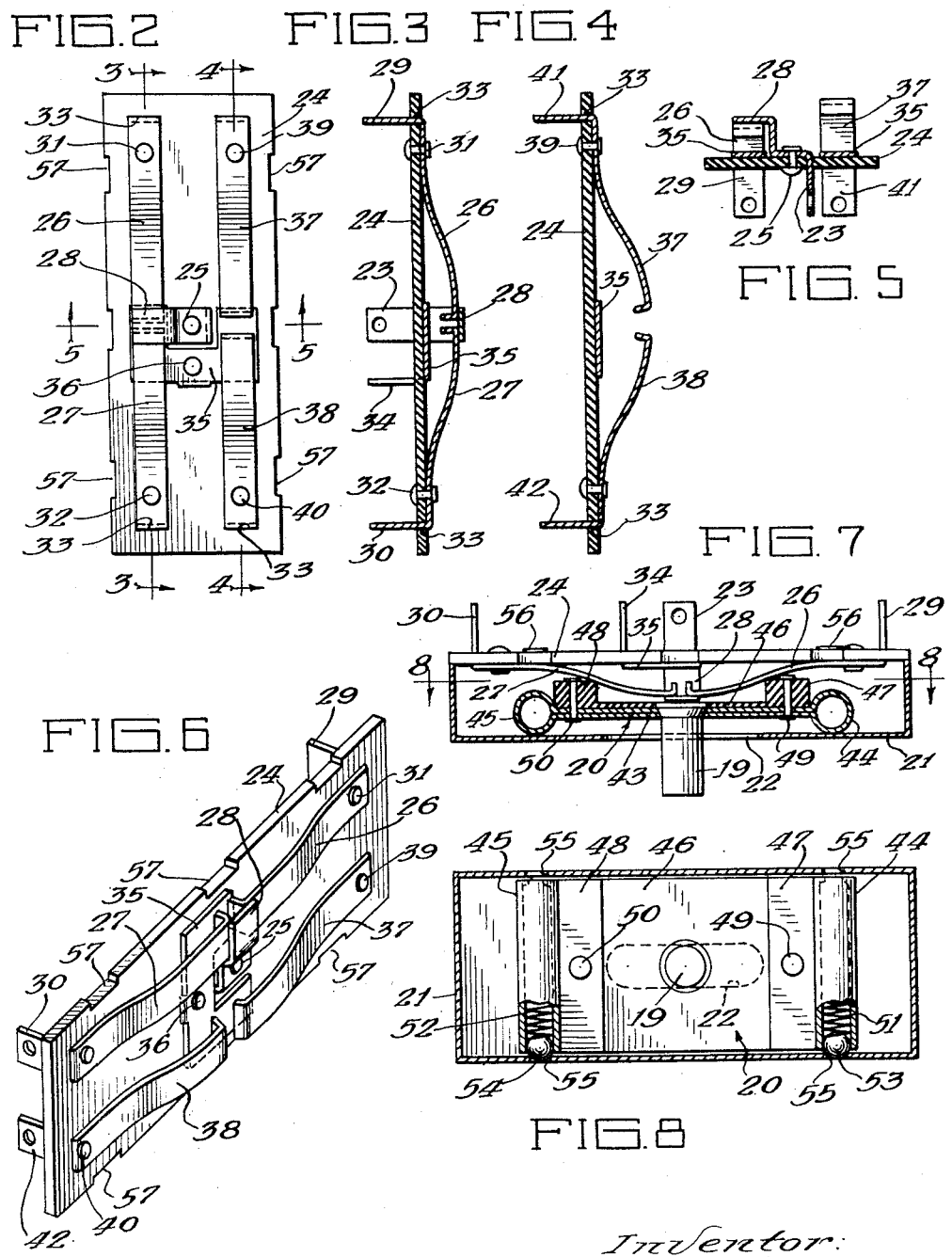

United States Patent Office 2,824,180
Patented Feb. 18, 1958

2,824,180

TURN SIGNAL SWITCH FOR VEHICLES

Horace N. Carver, Wichita, Kans., assignor to Miro-Flex Company, Inc., a corporation of Kansas Application March 10, 1955, Serial No. 493,525

4 Claims. (Cl. 200—16)

This invention relates to a turn signal switch for vehicles, and more particularly to a switch for closing the circuits to lamps on the front and rear of vehicles.

Turn signal switches have been in common use for many years, and most of them have a single mode of operation. By sliding an actuator over electrical switch contacts, the desired electrical circuits are completed with fore and aft signaling lamps through electrical contacts carried by the actuator. Since the switch contacts are generally of soft metal, they are frequently worn away by such sliding contact and ultimately become inoperative. The abrasive action of grit or dirt which often becomes lodged between a pair of switch contacts accelerates their deterioration. The foregoing undesirable features are obviated by the present invention.

The principal object of the present invention is to provide a turn signal switch in which the electrical circuit is completed without any sliding of one contact over another.

Another object is to provide a turn signal switch which is of extremely inexpensive construction, yet highly satisfactory operation.

A further object is to provide a turn signal switch in which all of the electrical conducting terminals or contacts are molded into a single carrier which may be simply attached to a switch housing.

Still another object is to provide a turn signal switch having a terminal carrier and actuator with symmetrical cooperating portions so that the switch may be correctly assembled in either of two positions.

The invention is illustrated in a preferred embodiment in the accompanying drawings, in which:

Fig. 1 is a bottom plan view of the turn signal switch showing a wiring diagram from a battery through the switch to a front and rear pair of lamps;

Fig. 2, a plan view of the inner side of the terminal carrier with the switch housing removed;

Fig. 3, a sectional view taken as indicated on line 3—3 of Fig. 2;

Fig. 4, a sectional view taken as indicated on line 4—4 of Fig. 2;

Fig. 5, a sectional view taken as indicated on line 5—5 of Fig. 2;

Fig. 6, a perspective view of the terminal carrier and attached spring arms;

Fig. 7, a sectional view of the turn signal switch showing the housing, the terminal carrier, the actuator member, and the spring arms in operative position; and Fig. 8, a sectional view taken as indicated on line 8—8 of Fig. 7.

In the wiring diagram shown in Fig. 1 a pair of front lamps are indicated at 10 and 11 and a pair of rear lamps at 12 and 13, both pairs being electrically connected to a battery 14 and to a ground common with the battery. On vehicles in which turn signal switches are used, it is necessary to arrange the electrical connections so that both of the rear lamps 12 and 13 will be lighted when brake pedal pressure is applied to close a brake pedal switch 15. In addition, the turn signal switch must be adapted to complete a circuit through a flasher mechanism 16, generally of the thermally responsive type, to either the left front and left rear lamps 10 and 12 or to the right front and right rear lamps 11 and 13, depending upon the desired direction of turn of the vehicle. If the brakes are being applied at the same time that one of the flasher circuits is connected, it is desirable that one of the rear lamps continue to glow steadily to indicate that the vehicle is stopping, and that the other rear lamp flashes intermittently to indicate the direction of turning. The turn signal switch of the present invention is particularly well adapted to effect all of these operations.

Although a canceling feature is not shown in the present embodiment, it is clear that a conventional structure for such a purpose may be built into the switch mechanism so that the flasher member 16 will be automatically disconnected after turning a corner. Oftentimes, when either a sharp turn is to be negotiated, or a long vehicle is to make a turn, it is desirable not have the canceling feature in order to permit the vehicle to swing initially in a direction opposite to the direction of turn before actually making the turn. Without the canceling feature, of course, the flashing signal will not be disconnected before the turn is actually made.

In the embodiment illustrated, a lever-like handle 17 is pivoted at 18, and has an end connected to a stud 19 of an actuator, generally designated 20, positioned in a switch housing 21. When the handle is pivoted, the stud 19 and the actuator 20 are moved linearly within the housing 21, the actuator 20 being guided in its movement by its close fit with the walls of the housing 21 and by the stud 19 operating in an elongated slot 22 in the housing 21.

The battery 14 is connected to both the circuit containing the brake pedal switch 15 and to the circuit containing the flasher 16, as can best be seen in Fig. 1. When the brake pedal switch 15 is closed, the circuit is completed from the battery to a terminal 23 secured to a terminal carrier 24 by a rivet 25, and to a pair of spring arms 26 and 27 biased into electrical contact at their free ends with an L-shaped portion 28 of the terminal 23 on the inner side of the carrier 24 (Figs. 2, 4 and 6). The other end of each of the spring arms 26 and 27 is preferably bent to form terminals 29 and 30, respectively, so that both the spring arms and the terminals may be secured to the carrier 24 by rivets, 31 and 32. The carrier 24 is made from an insulating material, and generally has small openings 33 punched in it through which the various terminals may be inserted. From the terminals 29 and 30 electrical connections are made to lamps 12 and 13, which in turn are grounded to the chassis of the vehicle. Thus, in the absence of any other condition in the switch circuits, when the brake pedal is depressed to close the switch 15, both of the lamps 12 and 13 will immediately give off a steady glow indicating the braking action.

The circuit from the battery 14 through the flasher mechanism 16 passes to a center terminal 34 on the terminal carrier 24. The terminal 34 is preferably integrally formed with a U-shaped plate 35 (Fig. 6) on the inner side of the terminal carrier 24, and is secured to the carrier by a rivet 36. A second pair of spring arms 37 and 38, similar to the first pair of arms 26 and 27, are mounted on the carrier 24 adjacent the first pair of arms by a pair of rivets 39 and 40. In addition to holding the spring arms 37 and 38 in position (Fig. 4), the rivets also secure to the carrier 24 a pair of terminals 41 and 42 which are struck upwardly from the attached ends of the spring arms 37 and 38 and which are electrically connected to the right front and left front lamps, 10 and 11. Each of the spring arms 37 and 38 is normally biased away from the U-shaped plate 35. When either one of the arms 37 or 38 is depressed, the circuit through the flasher mechanism 16 is completed, and an intermittent flashing signal is imparted to one or the other of the front lamps. Similarly, when either one of the spring arms 26 and 27 is depressed to break contact with the brake pedal switch 15 and to contact the U-shaped plate 35, the flasher circuit is completed to one of the rear lamps, 12 and 13. Thus, if the spring arms 26 and 37 are simultaneously pressed into contact with the plate 35, it is clear that a flashing signal will be imparted to the right front lamp 11 and to the right rear lamp 13; if the spring arms 27 and 38 are simultaneously depressed into contact with the plate 35, a flashing signal will be relayed to the left front lamp 10 and to the left rear lamp 12.

To effect the simultaneous depression of either spring arms 26 and 37 or 27 and 38, the linearly movable actuator 20 is provided. The actuator preferably includes a metal plate support 43 to which the stud 19 is secured, the plate support having a pair of tubular ends 44 and 45 upon which the actuator rides during its reciprocation within the switch housing 21. An insulating strip 46 having a pair of transversely extending shoulders 47 and 48 at its opposite ends is secured to the support plate 43 by rivets, 49 and 50.

In Figs. 7 and 8, the actuator 20 is shown in its centered or neutral position. The actuator is releasably held in this position by compression springs, 51 and 52, disposed within each of the tubular ends 44 and 45, each spring bearing outwardly against one of the ball bearings, 53 and 54, to releasably hold a ball in one of the openings 55 within the switch housing 21. A relatively light force exerted upon the stud 19 longitudinally of the switch housing 21 will easily cam the ball bearings out of the openings to permit slidable movement of the actuator.

When it is desired to bring the flashing mechanism into operation, it is necessary to linearly move the actuator so that one of the shoulders, 47 or 48, of the actuator 20 depresses either the spring arms 26 and 37 or 27 and 38 into contact with the U-shaped plate 35. For example, if it is desired to make a right-hand turn, the handle 17 is pivoted upwardly to bring the shoulder 47 into contact with the arms 26 and 37 to depress them into contact with the plate 35. This completes the circuit from the battery 14 through the flasher mechanism 16 to the terminal 34 and the U-shaped plate 35, and then through the arms 26 and 37 to the terminals 29 and 41 and the right front and right rear lamps 11 and 13.

For a left-hand turn, the handle 17 is pivoted downwardly so that the shoulder 48 of the actuator 20 depresses the spring arms 27 and 38 into contact with the U-shaped plate 35. As can be seen in Fig. 1, the flasher circuit is then completed from the battery 14 through the flasher 16 to the terminal 34 and the U-shaped plate 35, and then through each of the arms 27 and 38 to the terminals 30 and 42 and the left front and left rear lamps 10 and 12.

It is clear that the present switch is constructed so that the flasher and the brake pedal switch may be operated in conjunction to give a stop signal and a direction of turning signal at the same time. When the brake pedal switch 15 is closed, both rear lamps 12 and 13 are provided with a steady glow because the brake pedal switch circuit is closed to both lamps through the spring-biased arms 26 and 27 in engagement with the portion 28 of the terminal 23. If the brakes are applied and it is desired to make a left turn, the handle 17 is pulled downwardly to move the actuator shoulder 48 into engagement with the spring arms 27 and 38 and to depress these arms into contact with the plate 35. By depressing arm 38, the flasher mechanism 16 is placed in the circuit leading to the left front lamp 10, and it will accordingly flash intermittently. By depressing spring arm 27, a part of the brake pedal switch circuit is interrupted, and arm 27 is placed in the flasher circuit so that the left rear lamp 12 will flash intermittently. Since the spring 26 is still biased upwardly into contact with the portion 28 of the terminal 23, it is still in the brake pedal switch circuit, and consequently the right rear lamp will glow steadily.

It should be noted that the switch housing 21, the actuator 20 and the terminal carrier 24 of the present switch preferably are symmetrically formed at their opposite end portions so that either the actuator or the terminal carrier may be assembled in connection with the switch housing in either of two positions. The switch mechanism is preferably held together in its assembled position by a number of tabs 56 on the switch housing 21 which fit into notches 57 in the periphery of the terminal carrier and are bent at right angles to hold the carrier upon the housing.

An important feature of the present invention is that there is no sliding contact between electrical terminals which are to complete a circuit. In each case in the present invention contact is made by pressing a spring arm into contact with the terminal to make the proper electrical connection. Sliding movement in the switch of the present invention only occurs between the insulated shoulders 47 and 48 on the actuator 20 and portions of the spring arms which are not used to form electrical contacts. For this reason, the contacts do not deteriorate and wear out as quickly as in former switches. In most instances, switches formed in accordance with the present invention are even of greater life than that of the vehicle in which they are placed.

The foregoing detailed description is given for clearness of understanding only and no unecessary limitations should be understood therefrom, for some modifications will be obvious to those skilled in the art.

I claim:

1. A turn signal switch for a vehicle, comprising: a switch housing; an actuator slidable within the housing; a terminal carrier having a plurality of terminals mounted thereon, one for connection with each of two front and two rear signaling elements; a pair of contacts carried by said terminal carrier, each adapted for connection with a power source, one of said contacts being adapted for connection in series with a brake switch on the vehicle, and the other of said contacts being adapted for connection in series with a flasher unit; a spring arm secured to each terminal, the spring arms secured to the rear signaling element terminals being biased to make an electrical connection with said one contact, and the other spring arms being biased out of electrical juncture with said other contact, said actuator having an electrical insulating portion selectively slidable against said spring arms to move the arms directly into and out of electrical juncture with said contacts to effect desired flashing of said signaling elements.

2. A turn signal switch for a vehicle, comprising: a switch housing having insulated material secured thereto and in turn carrying a plurality of terminals each for connection with one of two front and rear signaling elements and a pair of electrical contacts each adapted for connection with a power source, one contact being adapted for connection in series with a brake switch and the other contact being adapted for connection in series with a flasher unit; two pairs of movable elements each connected to a terminal and being adapted for movement into electrical connection with the other contact, one of said pairs being normally electrically connected to said one contact and to the terminals for connection with the two rear signaling elements; and a movable actuator means within the housing for selectively engaging and connecting a movable element of each pair with said other electrical contact to effect flashing of said front and rear signaling elements as desired.

3. A turn signal switch for a vehicle as specified in claim 2, in which each of the movable elements is a spring arm having a free end yieldably movable into electrical connection with the other electrical contact to energize the desired signaling elements.

4. A turn signal switch for a vehicle as specified in claim 2, in which each of the movable elements is a spring arm having a free end yieldingly movable into electrical connection with the other electrical contact, and the actuator means is mounted for longitudinal sliding movement within the housing, said actuator means being provided with a transversely extending shoulder at each of its opposite end portions for engaging and moving a selected pair of the free ends of said spring arms into electrical connection with said other electrical contact during longitudinal movement of the actuator thereby energizing a desired pair of signaling elements.

References Cited in the file of this patent

UNITED STATES PATENTS

| | | |
|---|---|---|
| 990,120 | Disler | Apr. 18, 1911 |
| 1,846,513 | Douglas | Feb. 23, 1932 |
| 1,986,527 | Rach et al. | Jan. 1, 1935 |
| 2,152,450 | Arcelon | Mar. 28, 1939 |
| 2,294,953 | Bluemle | Sept. 8, 1942 |
| 2,659,838 | Du Rocher | Nov. 17, 1953 |
| 2,667,627 | Hollins | Jan. 26, 1954 |

FOREIGN PATENTS

| | | |
|---|---|---|
| 827,608 | Germany | Jan. 10, 1952 |